United States Patent [19]
Hughes

[11] 3,728,410
[45] Apr. 17, 1973

[54] HYDROCARBON CONVERSION

[75] Inventor: Thomas R. Hughes, Orinda, Calif.

[73] Assignee: Chevron Research Company, San Francisco, Calif.

[22] Filed: Jan. 25, 1971

[21] Appl. No.: 109,715

[52] U.S. Cl. ........260/668 B, 260/668 B, 260/671 B, 260/672 T, 260/676 R, 260/683.3
[51] Int. Cl. ..........................C07c 15/02, C07c 15/14
[58] Field of Search.......................260/672 T, 671 B, 260/668, 676 R, 683.3

[56] References Cited

UNITED STATES PATENTS

| | | | |
|---|---|---|---|
| 3,261,879 | 7/1966 | Banks | 260/676 R |
| 3,291,852 | 12/1966 | Egan | 260/676 R |
| 3,445,541 | 5/1969 | Heckelsburg et al. | 260/683.3 |
| 3,484,499 | 12/1969 | Lester et al. | 260/676 R |
| 3,574,779 | 4/1971 | Lester et al. | 260/676 R |

*Primary Examiner*—Curtis R. Davis
*Attorney*—T. G. De Jonghe, J. A. Buchanan, Jr., R. H. Davies and G. F. Magdeburger

[57] ABSTRACT

A process for converting an alkyl aromatic to a different alkyl aromatic which comprises contacting the alkyl aromatic and an alkane having at least two carbon atoms with a catalyst mass having a component which has catalytic activity for alkane dehydrogenation and a second component which has catalytic activity for olefin averaging. Preferred alkyl aromatic feedstocks are ethyl benzene and butyl benzene. A particularly preferred catalytic mass for the reaction comprises platinum on alumina and tungsten oxide on silica.

9 Claims, No Drawings

HYDROCARBON CONVERSION

BACKGROUND OF THE INVENTION

The present invention relates to the averaging or the reaction of hydrocarbons of different molecular weight together in the presence of a catalyst to obtain different hydrocarbons. The present invention particularly relates to the interaction or averaging of alkyl aromatic hydrocarbons with a saturated hydrocarbon moiety such as an alkane or a saturated alkyl group attached to an unsaturated hydrocarbon.

The term "alkyl aromatic" is used in the present specification to mean aromatic compounds having an attached alkyl group of at least two carbon atoms. The term "alkyl group" is used to mean an attached hydrocarbon group derived from an aliphatic hydrocarbon by the removal of one hydrogen atom as, for example, ethyl, propyl, butyl, pentyl, hexyl, etc. The term "aromatic" is used herein to mean primarily benzene or a benzene derivative, and to include higher aromatics such as naphthalene.

The term "molecular redistribution" is used in this specification to mean conversion of feed saturated hydrocarbon molecules or saturated moieties of hydrocarbon molecules to a product comprising saturated hydrocarbon molecules or saturated moieties of hydrocarbon molecules with a distribution of the number of carbon atoms per saturated molecule or saturated moiety different from that of the feed.

Molecular redistribution includes the following processes: Type 1: Disproportionation, which is the reaction of two identical molecules to form products with different numbers of carbon atoms per saturated molecule or moiety. Two examples are the reaction of two molecules of butane to form one molecule of propane and one molecule of pentane, and the reaction of two molecules of propylbenzene to form one molecule of ethylbenzene and one molecule of butylbenzene.

Type 2: Averaging, which is the formation of products having numbers of carbon atoms per saturated molecule or moiety intermediate between those of the molecules or moieties originally present in the feed. Two examples are the reaction of one molecule of butane with one molecule of octane to form two molecules of hexane, and the reaction of one molecule of ethylbenzene with one molecule of hexadecane to form one molecule of dodecylbenzene and one molecule of hexane.

Type 3: Processes which produce saturated hydrocarbon molecules and/or saturated moieties of hydrocarbon molecules with numbers of carbon atoms per saturated molecule and/or saturated moiety that are larger than the maximum and may be smaller than the minimum number of carbon atoms per saturated molecule and/or moiety in the feed. These processes can involve the reaction of two molecules originally present in the feed: for example, the reaction of butylbenzene with octane to produce ethylbenzene and decane. In addition, as the fraction of the original feed molecules converted increases, successive reactions of product molecules make an increasing contribution to the formation of products by means of Type 3 processes.

From the foregoing definitions, it is clear that disproportionation is a special case of a Type 3 process, in which the reactant saturated molecules or moieties have the same number of carbon atoms. Disproportionation is discussed as a separate process here, because it is widely recognized as a distinct reaction in the hydrocarbon processing industry. For example, in U.S. Pat. No. 3,340,322, disproportionation is defined as the conversion of a hydrocarbon into similar hydrocarbons of both higher and lower numbers of carbon atoms per molecule. In some cases, disproportionation is essentially the reverse reaction as compared to averaging (e.g., $2 C_6H_{14} = C_4H_{10} + C_8H_{18}$). At high conversion levels (e.g., ca. 70 percent or higher), the products from averaging equimolar mixtures of butane and octane tend to be nearly the same as from the disproportionation of hexane.

The Type 2 process of averaging is always accompanied by processes of Types 1 and 3, but in some cases a large or even major fraction of the total product is formed by averaging. This is particularly true when there is a large difference between the minimum and maximum number of carbon atoms per saturated molecule or moiety in the original feed. For example, in the reaction of ethylbenzene with hexadecane, a large fraction of the product alkylbenzenes will have alkyl groups containing more than two and less than 16 carbon atoms.

The term disproportionation is used in the present specification to refer to molecular redistribution reactions wherein the feedstock is substantially only one carbon atom number as, for example, a butane feedstock or a propylbenzene feedstock. On the other hand, the term averaging is used in the present specification to refer to molecular redistribution reactions wherein the feedstock comprises at least substantial amounts of components with two different carbon numbers as, for example, a feedstock comprising butanes and propylbenzene.

Averaging of alkanes is discussed further in my applications Ser. Nos. 864,870 and 864,871 both of which are now abandoned. The averaging processes disclosed in Ser. Nos. 864,870 and 864,871 are preferably carried out at a relatively low temperature, usually below about 850°F. According to the aforementioned patent applications, the averaging reaction is carried out using a catalytic mass having hydrocarbon dehydrogenation activity and olefin averaging activity or using a catalytic mass comprising a Group VIII component and a Group VIB component.

Averaging of saturated hydrocarbons or paraffinic hydrocarbons to form hydrocarbons of intermediate molecular weight has been carried out using acidic catalysts, such as boron fluoride-hydrogen fluoride catalysts. For example, U.S. Pat. No. 2,216,274 discloses a process for interacting relatively high molecular weight paraffin hydrocarbons with lower molecular weight isoparaffin hydrocarbons to form paraffin hydrocarbons of intermediate molecular weight by contacting the feed hydrocarbons with a catalytic material consisting essentially of boron fluoride and hydrogen fluoride at temperatures between about −30° and +150°C.

A number of other patents disclose paraffin averaging reactions using a catalyst comprised essentially of boron fluoride and hydrogen fluoride or boron fluoride, hydrogen fluoride and water. These patents include U.S. Pat. Nos. 2,296,371, 2,405,993, 2,405,994, 2,405,995, 2,405,996 and 2,405,997.

Numerous processes have also been disclosed using acidic-type catalysts for the disproportionation of saturated hydrocarbons.

Catalysts which have been used in the past for disproportionation of saturated hydrocarbons include solid catalysts comprised of $AlCl_3$ on alumina, boron fluoride with hydrogen fluoride and boron fluoride together with a promoter comprised of alkyl fluoride. The use of aluminum chloride solid catalyst was uneconomic because, among other reasons, the catalyst was non-regenerable. The use of either boron fluoride with hydrogen fluoride or boron fluoride with an alkyl fluoride was unattractive because of severe corrosion, sludge formation and other operating problems.

U.S. Pat. No. 3,445,451 discloses a process for the disproportionation of olefins and paraffins, using a combined dehydrogenation and disproportionation catalyst. According to the process of U.S. Pat. No. 3,445,541, disproportionation and dehydrogenation are combined. A hydrocarbon feed which is either a $C_3$, $C_4$, $C_5$ or $C_6$ acyclic paraffin or acyclic olefin is contacted with a combined dehydrogenation-disproportionation catalyst at conditions of temperature and pressure to promote dehydrogenation and disproportionation. According to the disclosure of U.S. Pat. No. 3,445,541 a temperature between 800° and 1200°F. may be used for the disproportionation-dehydrogenation reaction. However, the lowest temperature used for processing a paraffin in accordance with any of the examples of U.S. Pat. No. 3,445,541 is 980°F. Typically, the temperature used is between 1040° and 1125°F. The patent also points out that the disproportionation component used in Example 3 showed little activity for converting the propane at temperatures of about 1000° to 1050°F., whereas at 1100°F. appreciable conversion was obtained. Thus, the process of U.S. Pat. No. 3,445,541 is directed to disproportionation at temperatures generally above about 1000°F.

The feed which is converted in the examples of U.S. Pat. No. 3,445,541 consists of only one feed component in each of the experimental runs; that is, the feed used in the examples of U.S. Pat. No. 3,445,541 was either propane or propylene. Averaging reactions are not described or disclosed in U.S. Pat. No. 3,445,541, nor are reactions involving alkyl aromatics. In examples with both a paraffin feed and with an olefin feed in U.S. Pat. No. 3,445,541, the product contained a high concentration of olefins.

SUMMARY OF THE INVENTION

According to the present invention, a process is provided for converting an alkyl aromatic to a different alkyl aromatic which comprises contacting the alkyl aromatic and an alkane having at least two carbon atoms with a catalyst mass having a component which has catalytic activity for alkane dehydrogenation and a second component which has catalytic activity for olefin averaging. Preferred alkyl aromatic feed for the process of the present invention includes alkylbenzenes, particularly ethylbenzene and butylbenzene. The process of the present invention can be used to convert alkyl benzenes to either lower or higher carbon no. alkyl groups on the benzenes. It is particularly preferred to use the process of the present invention to obtain higher alkane benzenes than the feedstock alkyl benzene.

The process of the present invention is particularly advantageously used to separate ethyl benzene from other $C_8$ hydrocarbons such as xylenes, as we have found that ethylbenzene will react according to the process of the present invention to produce a higher molecular weight alkylbenzene whereas the xylenes will remain as unreacted components of the mixed $C_8$ feed. Therefore, a mixed $C_8$ feed can be treated according to the process of the present invention to convert ethylbenzene to a higher molecular weight hydrocarbon which can be much more readily separated from the remaining $C_8$ hydrocarbons (xylenes) by distillation than can ethylbenzene be separated from xylenes by distillation.

Also, the process of the present invention can be particularly advantageously used to convert ethylbenzene or other low alkylbenzenes such as propyl or butylbenzene to higher normal alkylbenzenes which could be used in the production of biodegradable detergents. Although some branched chain alkyl groups can be obtained on the benzene moiety in the process of the present invention, usually straight chain alkyl groups are obtained on the benzene when a linear alkylbenzene is reacted with a straight chain alkane. The amount of branched chain product is usually the same as the percent branched chain in the feed. Furthermore, in acid catalyzed alkylation reaction the alkylation of benzene with an alkyl group usually leads to a secondary alkyl benzene whereas the process of the present invention converts primary alkyl benzene to different primary alkylbenzene, e.g. higher primary alkylbenzenes.

The averaging reaction between the alkylbenzene and the alkane is carried out according to the process of the present invention using a catalytic mass having at least two components. The components, based on our experimental evidence, can be defined as a component having alkane dehydrogenation activity and a second component having olefin averaging activity. However, various interreactions and reaction mechanisms may be occurring in the process of the present invention other than the dehydrogenation-olefin averaging mechanism as discussed in my earlier applications mentioned above. We have found that the catalyst can alternatively be defined in a less functional manner as comprising a Group VIII metal component and Group VIB metal component.

Particularly preferred catalytic masses for use in the process of the present invention comprise platinum on alumina and a Group VIB metal on a refractory support. In the present specification the use of the term "-metal" is used to include the metal in its elemental form as well as compounds of the metals as, for example, oxides or sulfides of the metal.

As indicated above, ethylbenzene and butylbenzene are preferred alkyl aromatic feedstocks for the process of the present invention. Various other alkylbenzene feedstocks can be converted according to the process of the present invention to different alkylbenzenes. Preferred alkyl groups are those having from about two to six carbon atoms. In the manufacture of hydrocarbons for use in making detergents, it is usually preferred to use an alkyl aromatic wherein the alkyl group is linear, e.g. ethylbenzene, propylbenzene and n-butylbenzene.

Preferably, the alkane which is contacted with the alkyl aromatic or alkylbenzene in the presence of the catalytic mass is an alkane having from three to six carbon atoms, particularly straight alkanes such as propane, n-butane, n-pentane and n-hexane. In detergent manufacture preferred alkanes usually range somewhat higher, for example from $C_{10}$ to $C_{25}$ alkanes, and preferably the alkanes are straight chain alkanes.

Preferred temperatures for the reaction zone wherein the alkyl aromatic and alkane are contacted with the catalytic mass are temperatures between about 400° and 850°F. and more preferably, between 650°and 799°F. Pressure maintained in the reaction zone is preferably between atmospheric and 2500 psia and still more preferably between 100 and 1500 psia. In addition to the preferred relatively low temperatures for hydrocarbon averaging, we have found that it is preferable to carry out the averaging reaction in the presence of no more than a few weight percent olefins, preferably less than 5 weight percent olefins. Preferred conditions for the averaging of saturated hydrocarbon moieties are further discussed in my applications Ser. Nos. 864,870 and 864,871, the disclosures of which applications are incorporated by reference into the present application. The preferred saturated hydrocarbon averaging conditions discussed in these applications have been found specifically applicable to the averaging of alkyl aromatics with alkanes. As discussed under Background of the Invention in the aforementioned applications, the averaging reaction is believed to involve the completely saturated hydrocarbon group rather than the aromatic group in the process of the present invention. Thus, the benzene moiety of the alkyl aromatic feed component does not directly enter into the reaction. An exemplary averaging reaction according to the press of the present invention is as follows for ethylbenzene plus butane:

Ethylbenzene + butane → propylbenzene + propane

Preferred catalysts for use in the process of the present invention are also described further in my afore-identified applications. We have found that particularly preferred catalysts for the averaging of alkyl aromatics and alkylbenzenes with alkanes comprise platinum on alumina plus a second component comprising tungsten oxide on silica.

Although the process of the present invention is preferably applied to the reaction of an alkylbenzene on an alkyl aromatic with an alkane, the process of the present invention can also be applied to the reaction of an alkylbenzene with another alkylbenzene. We have found that ethylbenzene does not react with itself to an appreciable extent using the two component catalyst mass of the present invention. However, higher alkyl aromatics are believed to be suitable feedstocks for interaction using the two component catalyst according to the process of the present invention. Thus, the feedstock in the process of the present invention can comprise two alkyl benzene components which are interacted or average together with both of the alkylbenzene components having alkyl groups containing at least two carbon atoms, and at least one of the alkylbenzene components having an alkyl group containing more than two carbon atoms. In addition to obtaining higher and lower molecular weight alkylbenzenes by the averaging reaction using just the alkylbenzene feed components, diphenyl or polyphenyl alkanes can be prepared by the interaction of the alkyl benzene feed components with each other. These diphenyl or polyphenyl alkane products are particularly useful for polyfunctional detergents, for example, phosphate-free detergents. An exemplary reaction for the formation of a diphenyl from alkylbenzene feedstocks is as follows:

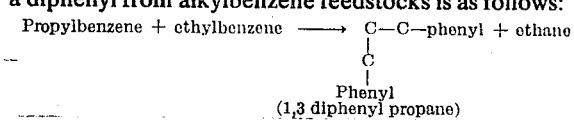

(1,3 diphenyl propane)

EXAMPLES

The following examples illustrate a particularly preferred catalytic mass for use in the process of the present invention and preferred feedstocks for the process of the present invention as well as preferred operating conditions. The catalyst used was a physical mixture of 1.61 g. of 42/60 mesh $WO_3$ on silica (8% $WO_3$) catalyst and 0.74 g. 42/60 mesh Pt on lithiated alumina (0.5% Pt, 0.5% Li). Approximately 0.85 g. of this catalyst mixture (approximately 1.8 cc.) was supported on a glass wool plug in a ¼ inch stainless steel reactor. The tube was installed in the catalyst testing unit and the catalyst pretreated four hours at 900°F. with a 1% $O_2$/99% $N_2$ stream, followed by at least 4 hours at 900°F. in flowing hydrogen. All the pretreatment was carried out at 50 psig or less.

Using the catalyst prepared as above, the temperature was reduced to 750°F. and the unit pressured to about 500 psig with nitrogen. Various feedstocks as described in the Table below were pumped over a guard bed containing activated 4 or 5 Angstrom molecular sieve ahead of metallic sodium in microporous alumina to remove $H_2O$ and other polar compounds. The feed was introduced to the reactor at a rate of about 1.8 ml./hr. or a liquid hourly space velocity (LHSV) of 1. The product stream was sampled periodically with a sampling valve and analyzed by vapor phase chromatography. The products were identified by their retention times.

Runs were made as described above for feedstocks of ethylbenzene/n-pentane, ethylbenzene/n-hexane, ethylbenzene/p-xylene/n-pentane and n-butylbenzene/n-pentane. Products n-propylbenzene, n-butylbenzene, n-pentylbenzene and ethylcyclohexane were identified by comparing their retention times with those of authentic materials. N-hexylbenzene and n-heptylbenzene identifies were assumed because of their retention times. The feed conversion was measured by disappearance of starting material. Selectivities were based on converted feed.

The following Tables summarize the feed, products and reaction conditions.

TABLE I

[Averaging N-pentane/ethylbenzene [1]]

| Run | A [3] | A [3] | A [3] | B [4] | B [4] | B [4] |
|---|---|---|---|---|---|---|
| Run time (hrs.) | 2 | 4 | 6 | 3 | 6 | 8 |
| n-Pentane conversion | 50.50 | 50.50 | 49.50 | 65.17 | 58.03 | 56.25 |
| Ethylbenzene conversion | 45.80 | 41.70 | 39.50 | 47.80 | 44.81 | 46.59 |
| Overall feed conversion | 48.53 | 45.43 | 43.72 | 60.00 | 54.10 | 53.45 |
| Product selectivities: [2] | | | | | | |
|   C₄ minus | 37.50 | 33.19 | 31.40 | 41.80 | 38.13 | 40.09 |
|   n-Parafins (C₆ plus) | 19.41 | 16.38 | 14.36 | 29.67 | 30.35 | 29.52 |
|   n-Alkylbenzenes | 32.95 | 40.50 | 39.07 | 22.85 | 26.91 | 25.57 |
|   Benzene plus toluene | 3.05 | 2.64 | 2.61 | 2.13 | 1.61 | 1.46 |
|   Others | 7.09 | 7.29 | 12.58 | 3.55 | 3.00 | 3.36 |

[1] Conditions: 750° F., 500 p.s.i.g., LHSV=1.
[2] Based on overall feed converted, i.e., selectivity is calculated by dividing the weight percent of the particular product species by percent overall feed conversion.
[3] Feed: 41.10% n-pentane/57.80% ethylbenzene.
[4] Feed: 68.03% n-pentane/31.44% ethylbenzene.

TABLE II

[Averaging different ratios of N-pentane/ethylbenzene [1]]

| Run | B216-24 [2] | B216-24 [2] | B216-24 [2] | B216-38 [3] | B216-38 [3] | B216-38 [3] |
|---|---|---|---|---|---|---|
| Run time (hrs.) | 2 | 4 | 6 | 3 | 6 | 8 |
| Results per 100 moles of ethyl benzene converted: | | | | | | |
| Moles n-pentane converted | 114 | 126 | 129 | 434 | 414 | 385 |
| Products (moles produced): | | | | | | |
| Benzene | 3 | 2 | 2 | 3 | 2 | 2 |
| Toluene | 4 | 4 | 4 | 7 | 5 | 4 |
| Propylbenzene | 28 | 30 | 31 | 38 | 38 | 33 |
| Butylbenzene | 13 | 18 | 18 | 23 | 25 | 22 |
| Pentylbenzene | 6 | 8 | 8 | 10 | 12 | 12 |
| Hexylbenzene | 2 | 3 | 4 | 3 | 5 | 5 |
| Heptylbenzene | | | | 1 | 2 | 2 |
| Total aromatics | 56 | 65 | 66 | 85 | 91 | 81 |

1. Conditions: 750° F., 500 p.s.i.g., LHSV=1.
2. Feed: 41.10% n-pentane/57.80% ethylbenzene.
3. Feed: 68.03% n-pentane/31.44% ethylbenzene.

TABLE III

AVERAGING CARRIED OUT WITH AN N-PENTANE/ETHYLBENZENE/P-XYLENE [1] MIXTURE

| Sample Time (Hrs.) | 1.5 | 3.7 | 5.5 | 7.25 | 9.00 |
|---|---|---|---|---|---|
| n-pentane conversion | 64.43 | 59.27 | 56.00 | 52.78 | 52.19 |
| ethylbenzene conversion | 24.80 | 21.01 | 29.33 | 28.42 | 29.33 |
| p-xylene conversion | 9.13 | 2.67 | −1.80 | −4.18 | −4.50 |
| overall feed conversion | 35.17 | 30.05 | 29.88 | 27.75 | 26.61 |
| Product Selectivities: [2] | | | | | |
| $C_4$ minus | 49.05 | 38.30 | 36.81 | 35.14 | 36.30 |
| n-paraffins ($C_5$+) | 18.77 | 18.70 | 21.22 | 21.84 | 22.40 |
| n-alkylbenzenes | 21.50 | 37.64 | 35.11 | 35.17 | 36.11 |
| benzene+toluene | 4.69 | 2.73 | 2.21 | 2.02 | 2.07 |
| others | 5.99 | 2.63 | 4.65 | 5.83 | 3.12 |

1. 750°F., 500 psig, LHSV = 1; feed: 37.0% pentane/29.8% ethylbenzene/32.2% p-xylene.
2. Based on overall feed converted.

TABLE IV

MOLAR RATIOS FROM N-PENTANE/ETHYLBENZENE/P-XYLENE [1]

| Sample Time (Hrs.) | 1.5 | 3.7 | 5.5 | 7.25 | 9.00 |
|---|---|---|---|---|---|
| Results per 100 moles of ethylbenzene converted: | | | | | |
| Moles n-pentane converted | 475 | 512 | 351 | 340 | 326 |
| Moles Produced | | | | | |
| benzene+toluene | 27 | 16 | 9 | 8 | 8 |
| propylbenzene | 61 | 76 | 49 | 47 | 44 |
| butylbenzene | 31 | 43 | 29 | 29 | 27 |
| pentylbenzene | — | 20 | 14 | 16 | 13 |
| hexylbenzene | — | 8 | 6 | 6 | 5 |
| Total Aromatics | 119 | 163 | 107 | 106 | 97 |

1. Run B216-34; 750°F., 500 psig, LHSV = 1; Feed: 37.0% n-pentane/29.8% ethylbenzene/32.2% p-xylene.

TABLE V

AVERAGING N-HEXANE/ETHYLBENZENE [1]

| RUN | B216-36 | B216-36 | B216-36 | B216-36 | B216-36 |
|---|---|---|---|---|---|
| Run Time (Hrs.) | 0.5 | 2.0 | 4.5 | 6.5 | 8.5 |
| n-hexane conversion [2] | 79.05 | 74.85 | 59.22 | 50.83 | 46.74 |
| ethylbenzene conversion [2] | 60.38 | 47.94 | 36.17 | 34.15 | 33.11 |
| overall feed conversion [2] | 69.19 | 61.12 | 47.05 | 42.02 | 39.54 |
| Product Selectivities: | | | | | |
| $C_4$ Minus | 53.76 | 34.23 | 34.22 | 35.13 | 33.03 |
| n-paraffins ($C_5$+) | 11.33 | 11.11 | 12.20 | 13.54 | 13.78 |
| n-alkylbenzenes | 13.47 | 35.01 | 34.13 | 36.44 | 37.40 |
| benzene+toluene | 6.26 | 3.76 | 2.51 | 2.86 | 2.28 |
| others [3] | 15.18 | 15.89 | 16.94 | 12.03 | 13.51 |

1. Conditions: 750°F., 500 psig, LHSV = 1.
2. Feed composition: 47.2% n-hexane/52.8% ethylbenzene.
3. Largely p-xylene contaminant from previous feed.

TABLE VI

MOLAR RATIOS FROM N-HEXANE/ETHYLBENZENE [1]

| Run Time | 0.5 | 2.0 | 4.5 | 6.5 | 8.5 |
|---|---|---|---|---|---|
| Results per 100 moles ethylbenzene converted: | | | | | |
| Moles n-Hexane converted | 144 | 172 | 184 | 164 | 156 |
| Products (Moles Produced) | | | | | |
| benzene | 5 | 3 | 2 | 2 | 2 |
| toluene | 11 | 8 | 6 | 6 | 4 |
| propylbenzene | 16 | 30 | 31 | 30 | 28 |
| butylbenzene | 7 | 18 | 18 | 17 | 18 |
| pentylbenzene | 2 | 10 | 10 | 11 | 11 |
| hexylbenzene | — | 6 | 6 | 6 | 6 |
| heptylbenzene | — | 3 | 2 | 2 | 3 |
| Total Aromatics | 41 | 78 | 75 | 74 | 72 |

1. Run B216-36; 750°F., 500 psig, LHSV = 1; Feed: 47.2% n-hexane/52.8% ethylbenzene.

TABLE VII

ALKYLBENZENE DISTRIBUTIONS FROM AVERAGING ETHYLBENZENE/PARAFFIN [1]

| RUN | B216-24 | B216-38 | B216-36 | B216-34 |
|---|---|---|---|---|
| Sample Time (Hrs.) | 6 | 6 | 6.5 | 5.5 |
| Feed Composition: [2] | | | | |
| n-pentane | 41.10 | 68.03 | — | 37.0 |
| n-hexane | — | — | 47.2 | — |
| ethylbenzene | 57.80 | 31.44 | 52.8 | 29.8 |
| p-xylene | — | — | — | 32.2 |
| Alkylbenzene Molar Ratios [3] | | | | |
| propylbenzene | 100 | 100 | 100 | 100 |
| butylbenzene | 58 | 64 | 58 | 58 |
| pentylbenzene | 26 | 32 | 36 | 30 |
| hexylbenzene | 13 | 14 | 21 | 12 |
| heptylbenzene | — | 5 | 7 | — |

1. 750°F., 500 psig, LHSV = 1.
2. Weight percent.
3. Normalized to 100 moles propylbenzene.

TABLE VIII

AVERAGING N-BUTYLBENZENE/N-PENTANE [1]

| Sample Time (Hrs.) | 3 | 4.5 | 6 | 8 |
|---|---|---|---|---|
| n-pentane conversion [2] | 38.41 | 38.93 | 36.26 | 37.01 |
| butylbenzene conversion [2] | 81.69 | 61.29 | 56.27 | 52.24 |
| total feed conversion [2] | 51.27 | 45.57 | 42.21 | 42.72 |
| Selectivities (Wt. %) [3] | | | | |
| $C_4$ minus | 38.52 | 32.72 | 32.55 | 32.70 |
| $C_5$ plus, n-paraffins | 34.15 | 31.09 | 29.97 | 30.29 |
| benzene | 1.27 | 1.05 | 1.04 | 0.89 |
| toluene | 2.38 | 2.52 | 2.56 | 2.20 |
| ethylbenzene | 7.98 | 9.85 | 10.12 | 9.29 |
| n-propylbenzene | 6.34 | 9.52 | 10.40 | 9.06 |
| n-pentylbenzene | 2.11 | 5.29 | 6.11 | 7.35 |
| n-hexylbenzene | 1.95 | 1.93 | 2.34 | 3.65 |
| others | 5.30 | 6.03 | 4.91 | 4.57 |

1. Conditions: Same catalyst as in previous tables, 520 psig, 750°F., LHSV = 1. Feed: 69.77% n-pentane, 29.50% n-butylbenzene.
2. Weight percent.
3. Weight percent, based on converted feed.

As can be seen from the above Tables, ethylbenzene is converted with alkanes to higher alkylbenzenes when contacted with the particularly preferred platinum on alumina-tungsten oxide on silica catalyst of the present invention at a preferred temperature below 799°F., namely 750°F. Under similar conditions, n-butylbenzene when reacted with n-pentane is converted to both higher and lower alkylbenzenes. In general, reaction or normal alkanes with n-alkylbenzenes results in distributions of n-alkylbenzenes as the major aromatic products. The molecular weight distributions of the product n-alkylbenzenes can be increased by increasing the molecular weights of the coreactant normal alkanes. The process of the present invention can also be applied to alkanes and alkyl aromatics having some branching in the saturated hydrocarbons or saturated moieties. In the absence of an added isomerization component, the particularly preferred platinum on alumina-tungsten oxide on silica catalyst of the present invention has little skeletal isomerization activity at the preferred temperatures below 799°F., so that the total concentration of branches in the saturated hydrocarbons or saturated moieties will usually be nearly the same for products as for feeds. As shown by Table III and Table IV, ethylbenzene can be selectively reacted out of a $C_8$ mixture containing xylenes. In these particular experiements, the xylenes were paraxylenes.

Contacting a substantially pure ethylbenzene feedstock with the preferred two component catalyst under similar reaction conditions (750°F., LHSV = 1.0) as indicated in the Tables above, resulted in very little conversion of the ethylbenzene. About 98 percent of the ethylbenzene remained unreacted.

Although various embodiments of the invention have been described, it is to be understood that they are meant to be illustrative only and not limiting. Certain features may be changed without departing from the spirit or scope of the invention. It is apparent that the present invention has broad application to the interaction of saturated hydrocarbon moieties with other saturated hydrocarbon moieties attached to aromatic moieties using a two-component catalyst comprising an alkane dehydrogenation component and an olefin averaging component. Accordingly, the invention is not to be construed as limited to the specific embodiments or examples discussed, but only as defined in the appended claims or substantial equivalents of the claims.

I claim:

1. A process for converting a feed alkyl benzene with at least two carbon atoms in an alkyl group to other alkyl benzenes with different numbers of carbon atoms in the alkyl groups than the feed alkyl benzene which comprises contacting the alkylbenzene and an alkane having at least two carbon atoms with a catalytic mass comprising a Group VIB metal and a Group VIII metal.

2. A process in accordance with claim 1 wherein the catalytic mass comprises platinum on alumina and a Group VIB metal on a refractory support.

3. A process in accordance with claim 1 wherein the feed alkyl group is a saturated hydrocarbon group having from 2 to 6 carbon atoms.

4. A process in accordance with claim 1 wherein the alkylbenzene is ethylbenzene.

5. A process in accordance with claim 1 wherein the alkylbenzene is butylbenzene.

6. A process in accordance with claim 3 wherein the catalytic mass comprises platinum on alumina and tungsten oxide on silica.

7. A process in accordance with claim 1 wherein the contacting is carried out at a temperature below 850°F. and in the presence of no more than 5 weight percent olefins.

8. A process in accordance with claim 1 wherein the feedstock to the contacting step comprises an alkylbenzene wherein the alkyl group has from two to six carbon atoms and an alkane wherein the alkane has from 10 to 25 carbon atoms so that the product from the contacting comprises a higher alkyl benzene aromatic suitable for the manufacture of a biodegradable detergent.

9. A process for converting alkylbenzenes to polyphenyl molecules which comprises contacting an alkylbenzene feed and a second alkylbenzene feed having an alkyl group with more than two carbon atoms with a catalytic mass comprising a Group VI B metal and a Group VIII metal. and wherein at least one of the alkylbenzene feeds is an alkylbenzene other than ethylbenzene.

* * * * *